July 17, 1956 W. P. MUNGER 2,754,656
AUTOMATIC VALVE
Filed April 4, 1952

INVENTOR
WILLIAM P. MUNGER
BY
AGENT

United States Patent Office 2,754,656
Patented July 17, 1956

2,754,656

AUTOMATIC VALVE

William P. Munger, Morristown, N. J., assignor to Reaction Motors, Inc., Rockaway, N. J., a corporation of New Jersey Application April 4, 1952, Serial No. 280,510

3 Claims. (Cl. 60—39.09)

The present invention relates to an automatic valve for closing the injection ports of a liquid propellant rocket motor while the motor is not in operation.

It is important to the proper functioning of a rocket motor of the liquid propellant type that the propellants, i. e. fuel and oxidizer, be prevented from accumulating in the combustion chamber when the motor is inoperative, for, if propellants are allowed to accumulate, there is great danger of fire and explosion as well as more prosaic starting difficulties because of the incorrect mixture ratios. Such leakage of fuel is also wasteful, and waste is an important factor when the motor is used in an aircraft where every drop of fuel may be important.

It is, therefore, an object of the present invention to provide an automatic valve to prevent leakage of liquid or gaseous fuel or oxidizer, i. e. propellants, into the combustion chamber of a reaction motor during those periods while the motor is inoperative.

It is also an object of the present invention to provide such a valve which is completely automatic in operation and requires little or no maintenance.

It is also an object of the present invention to provide a simple, light weight valve which is completely automatic in its action yet cannot interfere with the normal operation of the reaction motor with which it is associated.

Reaction motors, particularly those of the liquid propellant rocket type, ordinarily have orifices in the heads of their combustion chambers to admit propellant from an inlet chamber to the interior of the combustion chamber, the propellant being forced through the orifices by a large pressure differential existent between the interior of the inlet and that of the combustion chamber. When the engine is stopped, flow of the propellant or propellants is stopped by the closure of suitable poppet valves located in the supply line between the propellant tank or tanks and the motor's propellant inlet chambers. This action terminates combustion and prevents flow of any major quantity of propellant, but, it does not prevent residual propellant from slowly leaking from the inlet chamber, from the lines downstream of the main valves, and through the injection orifices into the combustion chamber. Here it accumulates and becomes a fire or explosion hazard. The present invention is a supplementary valve intended to be used in direct contact with the injection orifices to close them automatically after the main propellant valves have been closed and the engine has thus been made inoperative.

Other objects and advantages of the present invention will be apparent from the detailed description which follows.

Figure 1:
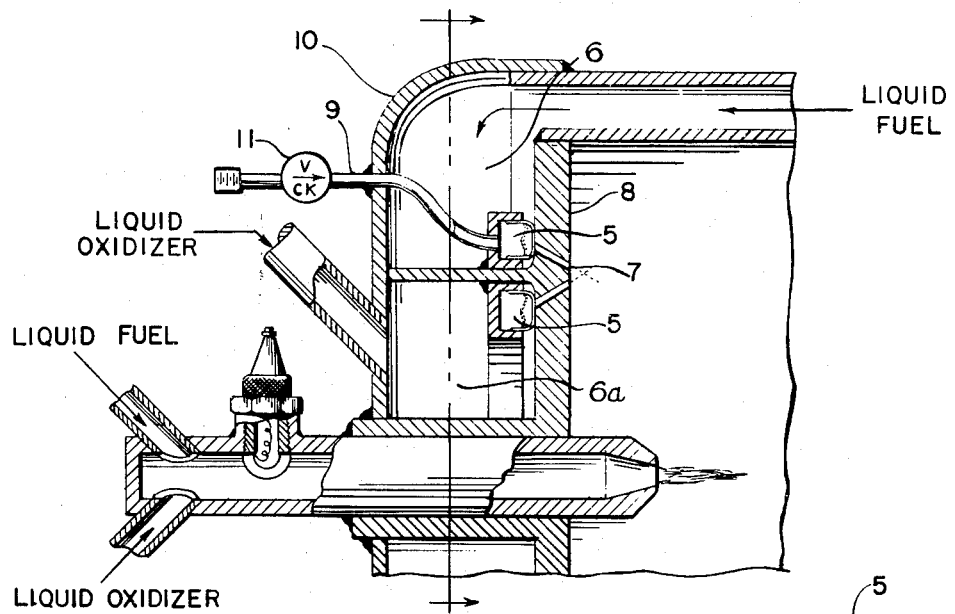
Figure 1 is a cross sectional view of the valve installed in a typical rocket engine thrust cylinder.
Figure 2:
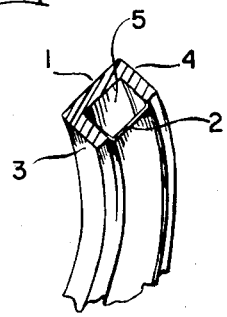
Figure 2 is a perspective cutaway view of the valve ready for installation.
Figure 3:
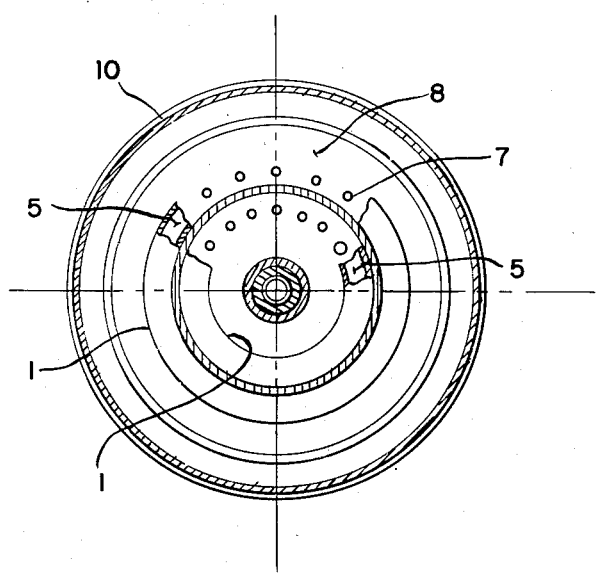
Figure 3 is a cross sectional view of a rocket engine inlet chamber showing the valve installed therein.

The valve comprises a hollow annular ring or body 1 having one side open to form a U-shaped cross section as shown in Figure 1. In the annular hollow space thus formed, there is an expansible flexible diaphragm 2 bonded to the walls 3 and 4 to form a gas-tight chamber 5 having one flexible and expansible wall or side. The entire device is adapted to fit within propellant inlet chambers 6 and 6a of a rocket motor in the manner shown with its flexible side towards injection orifices 7 and with its body portion firmly attached by welding or other suitable means to injector head 8. Chamber 5 is permanently filled with a gas under sufficient pressure to keep diaphragm 2 distended and forced against fluid outlet orifices 7 at all times except when propellant is actually being fed to inlet chamber 6 under high pressure as would be the condition if the motor was in operation. The pressure within chamber 5 should be of the order of perhaps 50 pounds per square inch which is sufficient to hold diaphragm 2 firmly against head 8 to close orifices 7 but is easily overcome by the pressure of the propellant as it is fed under a pressure much greater than 50 pounds, usually of the order of several hundred pounds. This internal pressure is maintained by means of a pressure connection conduit 9 which extends outward through the head 10 of the thrust chamber and terminates in check valve 11 for connection to a suitable source of pressure. Screw threads are provided on check valve 11 for the attachment of a gas pressure source, such as a hand pump. Such an arrangement is only necessary in the event that diaphragm 2 is made of material which has some degree of porosity and allows leakage to take place to some extent, thereby making it necessary to replenish the gas within the chamber from time to time to keep up the pressure.

Diaphragm or expansible side 2 can be made of one of the flexible plastic materials now available or a metal such as copper or stainless steel in thin enough form to allow flexibility of the diaphragm. If the pressures involved are great, it is advisable to provide a metal diaphragm thick enough to withstand the pressure differentials it is likely to encounter in practice, yet which is sufficiently flexible to move under the influence of that pressure differential. In a rocket engine injector installation as shown in Figure 1, a diaphragm of relatively non-corrosive metal would be necessary in view of the pressure differential and generally corrosive atmosphere in which the diaphragm operates. In the case of a metal expansible side, the metal is continuously welded to the inner and outer circular walls 3 and 4 to form a gas-tight seal. If plastic material is used for this purpose, it can be continuously heat-bonded or cemented in place. A metal having a plastic or resilient face or coating is useful in some instances where the injector face is slightly rough, thus preventing bare metal from fully seating.

It is preferable that a relatively inert gas be used within chamber 5 if possible. It is intended that nitrogen be used in the present embodiment although compressed air can be used providing the propellants do not react with it unfavorably.

As previously stated in this specification, the present invention is completely automatic in its operation, for the expansible side of the annular ring covers the injector orifices of the motor at all times unless the pressure of incoming propellant is sufficient to overcome the internal pressure of the ring to force its expansible side or diaphragm 2 away from the orifices. Conversely, side 2 moves back to cover the orifices upon removal of this propellant pressure.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a rocket motor including a combustion chamber, a fuel manifold, and an injector head separating said chamber and said manifold and having a plurality of circularly disposed injector orifices formed therein, said manifold being connected with a source of fuel from which flow is controlled by a pressure differential operated valve; a valve adapted to automatically trap fuel between the orifices and the source comprising a hollow annular member mounted in said manifold and having an opening coextensive with and adjacent said orifices, a flexible member bonded to the inner walls of said annular member and closing said opening, and fluid pressure means connected to said annular member and only sufficient to extend said flexible member into sealing contact with said orifices when no pressure differential exists between the orifices and the source.

2. The structure recited in claim 1 wherein said flexible member comprises thin metal.

3. The structure recited in claim 1 wherein said flexible member comprises plastic material.

References Cited in the file of this patent

UNITED STATES PATENTS

| | | |
|---|---|---|
| 1,550,376 | Longacre | Aug. 18, 1925 |
| 2,217,649 | Goddard | Oct. 8, 1940 |
| 2,261,364 | Grove | Nov. 4, 1941 |
| 2,505,798 | Skinner | May 2, 1950 |
| 2,610,645 | Wagner | Sept. 16, 1952 |
| 2,663,121 | Ramsey | Dec. 22, 1953 |

FOREIGN PATENTS

| | | |
|---|---|---|
| 611,934 | Great Britain | Nov. 5, 1948 |